United States Patent
Sugiura

(10) Patent No.: US 8,726,268 B2
(45) Date of Patent: May 13, 2014

(54) COMPUTER-READABLE MEDIUM, INFORMATION PROCESSING APPARATUS, DISPLAY CONTROL METHOD

(75) Inventor: Kazuhiko Sugiura, Hekinan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 937 days.

(21) Appl. No.: 12/361,562

(22) Filed: Jan. 29, 2009

(65) Prior Publication Data

US 2009/0193412 A1   Jul. 30, 2009

(30) Foreign Application Priority Data

Jan. 30, 2008 (JP) ................................ 2008-019230

(51) Int. Cl.
*G06F 9/445* (2006.01)
*G06F 3/12* (2006.01)
*G06F 11/07* (2006.01)

(52) U.S. Cl.
CPC ............ *G06F 3/1293* (2013.01); *G06F 3/1296* (2013.01); *G06F 3/123* (2013.01); *G06F 3/1297* (2013.01); *G06F 11/0733* (2013.01)
USPC ............................ 717/174; 717/175; 717/176

(58) Field of Classification Search
CPC ....................................................... G06F 9/445
USPC ............................ 717/174, 175, 177; 715/764
See application file for complete search history.

(56) References Cited

U.S. PATENT DOCUMENTS

| 2004/0123284 | A1* | 6/2004 | Bryant et al. | 717/174 |
| 2004/0184069 | A1* | 9/2004 | Mifune | 358/1.15 |
| 2005/0268236 | A1* | 12/2005 | Kosaka | 715/718 |
| 2006/0095924 | A1 | 5/2006 | Inoue | |
| 2006/0158686 | A1 | 7/2006 | Watanabe | |
| 2006/0265671 | A1* | 11/2006 | Shiono et al. | 715/859 |
| 2008/0163195 | A1* | 7/2008 | Kang | 717/174 |

FOREIGN PATENT DOCUMENTS

| JP | 06-231173 | 8/1994 |
| JP | 6-342360 A | 12/1994 |
| JP | 2006-127218 | 5/2006 |
| JP | 2006-201481 | 8/2006 |
| JP | 2007-164604 | 6/2007 |

OTHER PUBLICATIONS

JP Office Action dtd Nov. 10, 2009, JP Appln. 2008-019230, partial English translation.
"Special Topic Small Business Server 2000 Speed Understanding & Speed Establishment Part 2 Easy!! SBS 2000 Install," Enterprise Servers World, IDG Japan, Inc., May 1, 2001, vol. 4, No. 5, pp. 41-50.

* cited by examiner

*Primary Examiner* — Chat Do
*Assistant Examiner* — Lynda Dinh
(74) *Attorney, Agent, or Firm* — Banner & Witcoff, Ltd.

(57) ABSTRACT

A computer-readable medium causes an information processing apparatus capable of performing a plurality of setting processing for making a setting in accordance with a predetermined sequence to perform processing including a first display control process including displaying a corresponding setting image for each of the plurality of setting processing, an information acceptance process including accepting information required to perform the setting processing through the displayed setting image, a shift command acceptance process including accepting a shift command for making a shift toward another setting processing from setting processing corresponding to the setting image displayed in the first display control process, and a second display control process including displaying an input completion image showing information accepted in the information acceptance process in addition to the setting image corresponding to the setting processing to be shifted by the shift command when the shift command is accepted in the shift command acceptance process.

15 Claims, 9 Drawing Sheets

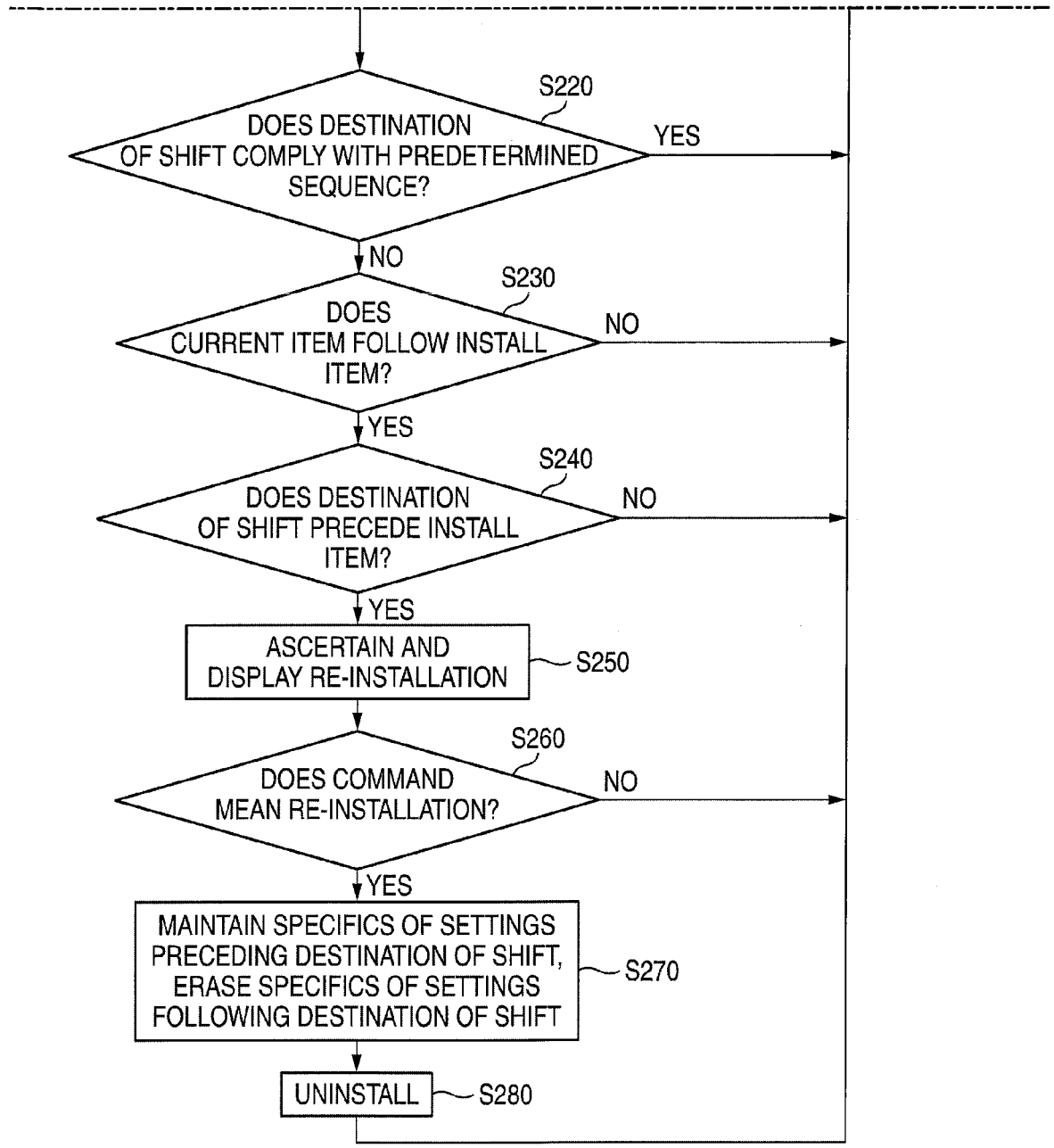

COMPUTER-READABLE MEDIUM, INFORMATION PROCESSING APPARATUS, DISPLAY CONTROL METHOD

CROSS-REFERENCE TO RELATED APPLICATIONS

This application claims priority from Japanese Patent Application No. 2008-019230 filed on Jan. 30, 2008, the entire subject matter of which is incorporated herein by reference.

TECHNICAL FIELD

The invention relates to an information processing apparatus that respectively performs a plurality of processing in accordance with a predetermined sequence, a program stored on a computer-readable medium for causing the information processing apparatus to perform the plurality of processing, and a display control method performed by the information processing apparatus as a result of the program being performed.

BACKGROUND

There has been proposed a print system having an information processing apparatus, such as a personal computer, and an image forming apparatus connected to the information processing apparatus through a network cable, or the like.

The print system becomes usable by performing so-called setup operation for installing application software and a device driver (herein after simply called as "software") in the information processing apparatus and further making various settings (e.g., operation for attaching cartridges to an image forming apparatus, and the like) to the information processing apparatus and the image forming apparatus. In many cases, work items of the setup operation (i.e., installation) include a plurality of input information setting processing for making a setting with regard to at least one item in accordance with an input from the outside, and setup operation (i.e., install operation) is arranged so as to cause processing pertaining to the work items to proceed in accordance with a predetermined sequence.

Incidentally, a plurality of work items is contained in installation of software and setup operation including the installation. Thus, a user of the print system may become uncertain which work items have already been performed and which work items have not yet been performed.

JP-A-2006-201481 discloses a related art program that is executed by an information processing apparatus to detect a state of connection with an image forming apparatus (i.e., whether or not a network cable is connected) and a state of installation of a device driver in order to determine work items which have already been performed and work items which have not yet been performed on the basis of a result of detection. The related art programs displays an image showing completion of performance on a display screen of the information processing apparatus in connection with the work items that have already been performed.

SUMMARY

Illustrative aspects of the invention provide a program stored on a computer-readable medium, an information processing apparatus, and a display control method that enable ascertainment of specifics of input information.

DETAILED DESCRIPTION

<General Overview>

Figure 1:
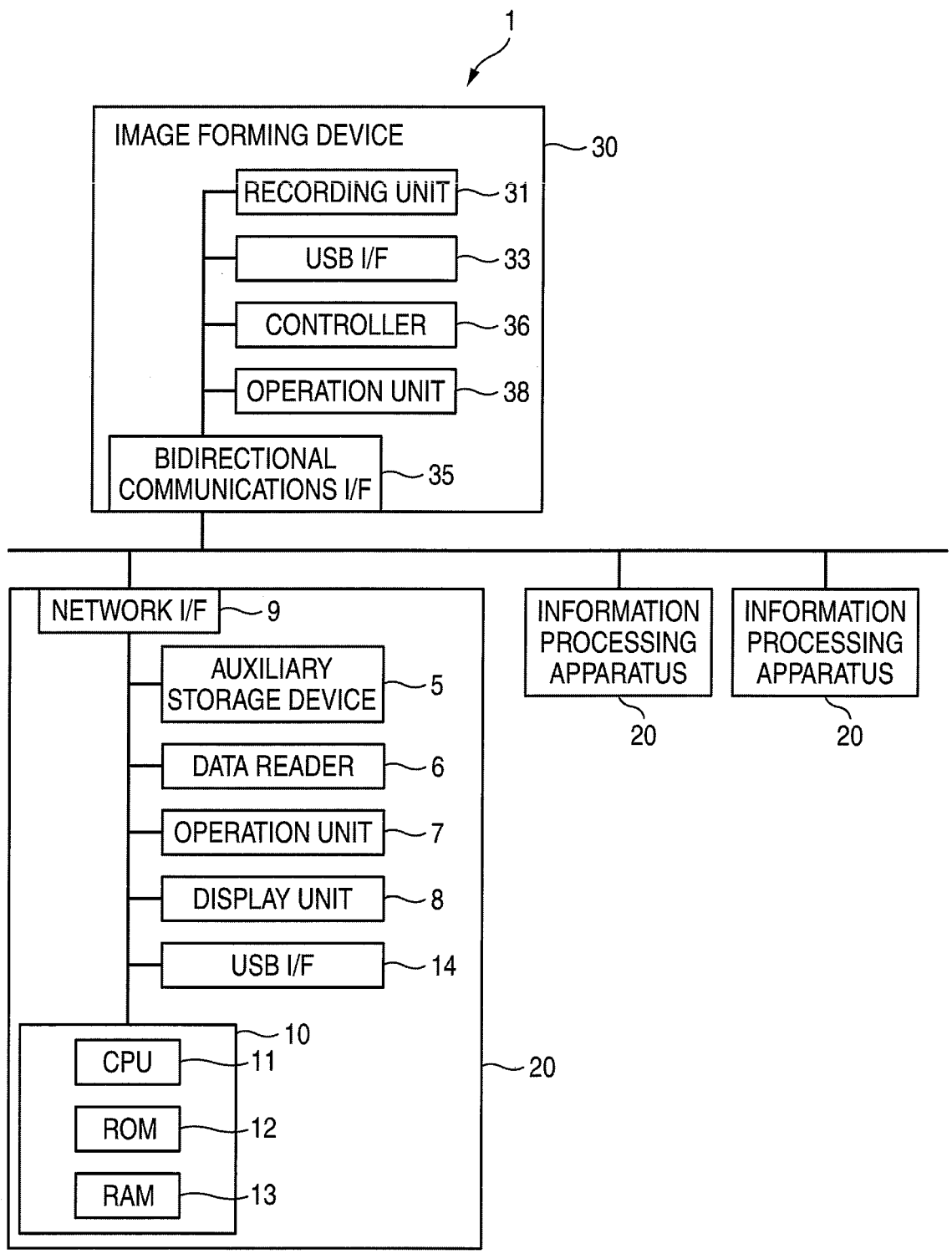
FIG. 1 is a block diagram of a print system.

The related art program described above has some disadvantages. For example, the related art program merely displays an image showing completion of performance in connection with the work items that have already been performed. When the work items that have already been performed correspond to setting operation, the user cannot ascertain the nature of setting operation (i.e., the nature of input information).

Therefore, for example, even when the related art program is used during installing operation, a display image provided on the display screen must be returned to a display image showing a work item of interest, namely, processing must be returned to the work item of interest, in order to ascertain a setting (information) inputted by the user during the setting processing that has already been performed, which involves consumption of efforts.

Accordingly, illustrative aspects of the invention provide a program stored on a computer-readable medium, an information processing apparatus, and a display control method that enable ascertainment of specifics of information input in regard to an item, which has already been performed, without returning processing.

According to a first illustrative aspect of the invention, there is provided a computer-readable medium having a computer program stored thereon and readable by a computer, the computer program, when executed by an information processing apparatus that is capable of performing a plurality of setting processing for making a setting pursuant to an input in accordance with a predetermined sequence, causes the information processing apparatus to perform processing comprising: a first display control process comprising displaying a corresponding setting image for each of the plurality of setting processing; an information acceptance process comprising accepting information required to perform the setting processing through the setting image displayed in the first display control process; a shift command acceptance process comprising accepting a shift command for making a shift toward another setting processing from setting processing corresponding to the setting image displayed in the first display control process; and a second display control process comprising displaying an input completion image showing information accepted in the information acceptance process in addition to the setting image corresponding to the setting processing to be shifted by the shift command when the shift command is accepted in the shift command acceptance process.

That is, when the shift command is accepted after the information processing apparatus has performed the program stored on the computer-readable medium of the invention and accepted information in the information acceptance process, the input completion image that shows the information accepted in preceding setting processing is displayed in addition to the setting image corresponding to setting processing to which a shift is to be made in accordance with the shift command.

Therefore, the program stored on the computer-readable medium of the invention enables the user to ascertain specifics of information input by means of preceding setting processing (herein after called "inputted information") without returning setting processing in the middle of performance of processing pertaining to the program.

The word "setting processing" used herein includes processing, or the like, for causing the user to ascertain previously-defined information required to perform processing as well as processing for making a setting in relation to at least one item required to perform processing in accordance with an input from the outside (herein after called "input information setting processing").

According to a second illustrative aspect of the invention, in the computer-readable medium, the second display control process comprises displaying the input completion image in a mode distinguishable from the setting image.

Such a program stored on the computer-readable medium enables the user to more reliably ascertain specifics of the inputted information, because the input completion image and the setting image are displayed in a distinguishable manner.

The distinguishable manner includes displaying an input completion image and a setting image in different colors and displaying an input completion image and a setting image so as to be distinguished from each other in terms of a size, as well as including separating a display area for an input completion image from a display area for a setting image.

According to a third illustrative aspect of the invention, in the computer-readable medium, the second display control process comprises displaying the input completion images while the input completion images are arranged in the predetermined sequence.

According to such a program stored on the computer-readable medium, the input completion images are arranged in accordance with the predetermined sequence. Therefore, the user can ascertain the sequence of transition of setting processing, and the user can readily find inputted information that the user desires to know.

According to a fourth illustrative aspect of the invention, in the computer-readable medium, the one of the plurality of setting processing comprises install processing, the install processing comprising installing software in the information processing apparatus.

Software used herein includes a so-called device driver by means of which the information processing apparatus controls peripheral devices, such as an image forming device, so-called application software for processing and producing data by means of the information processing apparatus, and the like.

According to a fifth illustrative aspect of the invention, in the computer-readable medium, the processing further comprises: a first selection acceptance process comprising accepting a selection command for selecting one from the input completion images displayed in the second display control process; and an ascertainment mode display process comprising displaying a selected input completion image in a mode, in which information accepted in the information acceptance process is recognizable, when the selection command is accepted in the first selection acceptance process.

In such a program stored on the computer-readable medium, when the selection command is accepted in the first selection acceptance process, an input completion image is displayed in a mode in which inputted information is ascertainable. Therefore, the user can more reliably as certain specifics of inputted information that the user desires to know.

The recognizable mode used herein includes magnifying a selected input completion image so as to become larger than the other input completion images, changing the color of an area where information about a selected input completion image is provided so as to become different from the color of the other area, and the like.

According to a sixth illustrative aspect of the invention, in the computer-readable medium, the processing further comprises: a second selection acceptance process comprising accepting a selection command for selecting one from the input completion images displayed in the second display control process; and a shift process comprising making a shift to the first display control process so as to display the setting image corresponding to the selected input completion image when the selection command is accepted in the second selection acceptance process.

In such a program stored on the computer-readable medium, a shift is made to the first display control process (and a subsequent information acceptance process) in such a way that the setting image corresponding to the selected setting processing is displayed in the first display control process. Therefore, the user can change the information set in connection with the selected setting processing by means of only selecting an input completion image.

Therefore, the program stored on the computer-readable medium of the invention makes it possible to change already-inputted information (a setting) by simple operation even in setting processing that has already been performed, so that usability can be improved.

In an install program, or the like, setting processing subsequent to specific setting processing (herein after called "specific processing") greatly changes, depending on a setting made in the specific processing based on the information accepted in the information acceptance process, in terms of the size of information that can be input. There is a high possibility of once-inputted information cannot be used again. In short, for example, in an install program for installing a device driver for an image forming device, setting processing to be made for each model type is frequently prepared after setting processing (the processing corresponds to specific processing) for selecting the model of an image forming device. When the model selected through specific processing is different, the information inputted when another model is selected becomes unnecessary.

According to a seventh illustrative aspect of the invention, in the computer-readable medium, the processing shift process further comprises: an information invalidation process comprising invalidating the information accepted in the information acceptance process in connection with setting processing that follows, in terms of the predetermined sequence, setting processing corresponding to the input completion image selected in the second selection acceptance process.

In the program stored on the computer-readable medium according to the sixth or seventh aspect, when the current setting processing (i.e., setting processing that enables inputting of information in the information acceptance process at a present point in time) follows install processing and when setting processing to be changed precedes install processing, software installed through install processing must be uninstalled in order to return setting processing. For this reason, setting processing by means of which the user desires to change a setting (information) (i.e., setting processing to be changed) can be changed after performance of all of the setting processing, efforts can be lessened by performing the remaining setting processing rather than returning the setting processing to the setting processing to be changed.

According to an eighth illustrative aspect of the invention, in the computer-readable medium, setting processing corresponding to a setting image displayed in the first display control process is taken as current setting processing, setting processing corresponding to the input completion image selected in the second selection acceptance process is taken as change-target setting processing, a determination is made whether or not the current setting processing follows the install processing in terms of the predetermined sequence, and another determination is made as to whether or not the setting processing to be changed precedes the install processing in terms of the predetermined sequence, and, when results of determination show that the current setting processing follows the install processing in terms of the predetermined sequence and when the setting processing to be changed precedes the install processing in terms of the predetermined sequence, the information processing apparatus performs a shift prohibition process comprising prohibiting the processing shift process.

In the program stored on the computer-readable medium according to the sixth or seventh aspect, even when the current setting processing follows install processing and when setting processing to be changed precedes install processing, there is a possibility of lessening efforts by re-installing software if setting processing for which the user desires to change a setting (information) cannot be changed after performance of all of the setting processing.

According to a ninth illustrative aspect of the invention, in the computer-readable medium, setting processing corresponding to a setting image displayed in the first display control process is taken as current setting processing, setting processing corresponding to the input completion image selected in the second selection acceptance process is taken as setting processing to be changed, a determination is made whether or not the current setting processing follows the install processing in terms of the predetermined sequence, and another determination is made as to whether or not the setting processing to be changed precedes the install processing in terms of the predetermined sequence, and, when results of determination show that the current setting processing follows the install processing in terms of the predetermined sequence and when the setting processing to be changed precedes the install processing in terms of the predetermined sequence, a shift is made toward the processing shift process, and the information processing apparatus performs a re-install process comprising re-installing the software in accordance with information accepted in the information acceptance process.

The word "re-installation" used herein includes re-installation of different software after uninstallation of installed software, as well as including re-installation of the same software after uninstallation of installed software.

According to a tenth illustrative aspect of the invention, in the computer-readable medium, the re-install process further comprises an execution selection acceptance process comprising causing a user to select whether or not to perform re-install operation.

The program stored on the computer-readable medium of the invention enables the user to select whether or not to perform re-installation contingent on efforts. Therefore, usability can be improved.

According to an eleventh illustrative aspect of the invention, in the computer-readable medium, the second display control process further comprises capturing a setting image displayed in the first display control process and taking the acquired image as the input completion image.

Such a program stored on the computer-readable medium enables easy preparation of an input completion image. In addition, according to the program stored on the computer-readable medium of the invention, a setting image for which the user has inputted information in each of the plurality of setting processing is displayed as an input completion image. Therefore, the user can more reliably find inputted information that the user desires to know.

According to a twelfth illustrative aspect of the invention, in the computer-readable medium, the second display control process further comprises displaying the input completion image in which the information accepted in the information acceptance process is highlighted.

According to such a program stored on the computer-readable medium, the information inputted through setting processing is highlighted. Therefore, the user can be caused to more reliably as certain specifics of the information inputted through previous setting processing.

The word "highlighting" used herein includes displaying an area of an input completion image where information is provided so as to become different in color from the other area of the input completion image, displaying in boldface type only information provided in an input completion image, and the like.

According to a thirteenth illustrative aspect of the invention, in the computer-readable medium, the process further comprises: a third display control process comprising displaying all setting processing scheduled to be performed by the information processing apparatus.

Such a program stored on the computer-readable medium enables the user to previously ascertain all of the setting processing scheduled to be executed before execution of the respective setting processing. As a consequence, the user can readily ascertain a progress achieved at a present point in time.

Incidentally, when setting processing to be shifted by a shift command is not input information setting processing, no change is made to the information (setting) inputted by the user. Thus, an input completion image corresponding to setting processing other than the input information setting processing is univocally derived.

Therefore, the program stored on the computer-readable medium of the invention may also be configured such that, when a shift command is accepted in a shift command acceptance process, a determination is made, in the second display control process, as to whether or not the setting processing to be changed is input information setting processing. When a result of determination shows that setting processing to be shifted is not the input information setting processing, a setting image achieved in the setting processing to be shifted is displayed in an unmodified form as an input completion image.

Such a program stored on the computer-readable medium enables the user to ascertain that the next setting processing is not input information setting processing at a point in time when a shift command is input.

The invention may also be applied to an information processing apparatus that performs, in accordance with a predetermined sequence, respective setting processing for making settings pursuant to an input from the outside.

According to a fourteenth illustrative aspect of the invention, there is provided an information processing apparatus that respectively performs, in accordance with a predetermined sequence, a plurality of setting processing for making a setting pursuant to an input, the apparatus comprising: a first display control unit that displays a corresponding setting image for each of the plurality of setting processing; an information acceptance unit that accepts information required to perform the setting processing through the setting image displayed by the first display control unit; a shift command acceptance unit that accepts a shift command for making a shift toward another setting processing from setting processing corresponding to the setting image displayed by the first display control unit; and a second display control unit that displays an input completion image showing information accepted by the information acceptance unit in addition to the setting image corresponding to the setting processing to be shifted by the shift command when the shift command is accepted by the shift command acceptance unit.

Moreover, the invention may also be as applied to a display control method executed by an information processing apparatus that performs, in accordance with a predetermined sequence, respective setting processing for making settings pursuant to an input from the outside.

According to a fifteenth illustrative aspect of the invention, there is provided a display control method executed by an information processing apparatus that respectively performs, in accordance with a predetermined sequence, a plurality of setting processing for making a setting pursuant to an input, the method comprising: displaying a corresponding setting image for each of the plurality of setting processing; accepting information required to perform the setting processing through the displayed setting image; accepting a shift command for making a shift toward another setting processing from setting processing corresponding to the displayed setting image; and displaying an input completion image showing the accepted information in addition to the setting image corresponding to the setting processing to be shifted by the shift command when the shift command is accepted.

Exemplary Embodiments

Exemplary embodiments of the invention will now be described with reference to the drawings.
(Print System>
FIG. 1 is a block diagram showing a general configuration of a print system including an information processing apparatus capable of executing a program to which the invention is applied.

A print system 1 includes a plurality of information processing apparatus 20 that generate print data and at least one image forming apparatus 30 that produces an image on a recording medium from print data generated by the plurality of information processing apparatus 20. The plurality of information processing apparatus 20 and the image forming apparatus 30 are connected to a local area network (LAN) (i.e., they are interconnected by a LAN cable or a wireless LAN). The print system 1 may also include one information processing apparatus 20 and one image forming apparatus 30 that are connected together by USB cables.

In the print system 1, the plurality of information processing apparatus 20 executes a device driver (which will be described later) so as to generate print data and transmit the generated print data to the image forming apparatus 30. The image forming apparatus 30 that acquired (received) the print data produces an image on a recording medium from the print data.
(Image Forming Apparatus)

The image forming apparatus 30 includes a recording unit 31 that prints an image produced from the print data on the recording medium, such as a sheet; an USB interface (I/F) 33 that performs inputting and outputting of image information with respect to the plurality of external information processing apparatus 20 and an external device, such as a digital camera, by USB cables; and a bidirectional communications interface (I/F) 35 that performs inputting and outputting of information with respect to the plurality of information processing apparatus 20 through a local area network. The image forming apparatus 30 further includes an operation unit 38 including cursor keys and switches for inputting various settings and commands and a display panel for displaying specifics entered by the user, various menu screens, an error indication, and the like, and a controller 36 that controls the respective units of the device (i.e., the recording unit 31, the USB I/F 33, the bidirectional communications I/F 35, and the like) in accordance with a setting or command input by the operation unit 38.

The controller 36 includes ROM that stores programs; RAM that temporarily stores data; NVRAM that stores data required to be preserved even when power is shut down; and a CPU that performs processing in accordance with a program.

The ROM stores a print processing program that determines an operation mode showing an operation mode of the image forming apparatus 30 in accordance with print data acquired from the information processing apparatus 20 and that performs image forming operation for printing an image produced from the print data on a recording medium in accordance with the determined operation mode.
(Information Processing Apparatus)

The information processing apparatus will now be described.

As shown in FIG. 1, each of the plurality of information processing apparatus 20 includes a data reader 6 that reads a program, data, and the like, stored in CD-ROM, DVD-ROM, and the like; an auxiliary storage device 5 that stores a program, data, and the like; an operation unit 7 for inputting various information required to cause the information processing apparatus 20 to operate; and a display unit 8 for displaying an image. The information processing apparatus 20 further includes a control unit 10 that controls respective units (e.g., the data reader 6, the operation unit 7, and the like) constituting the information processing apparatus 20; a network interface (network I/F) 9 for connecting the information processing apparatus 20 to the local area network; and an USB interface (I/F) 14 that performs inputting and outputting of information with respect to an external device by the USB cable. The information processing apparatus 20 is a well-known device configured as a so-called personal computer (used herein so as to imply the operation unit 7 and the display unit 8 in a broad sense).

The operation unit 7 is built from external input devices, such as a mouse and a keyboard, and is connected to the control unit 10 by a connection unit, such as the USB I/F 14, for inputting various information.

The display unit 8 is built from a display device, such as a liquid-crystal display. In order to display an image output from the control unit 10, the display unit 8 is connected to the control unit 10 by a connection unit, such as a video board (not shown). By means of a well-known graphical user interface (GUI) function belonging to a personal computer, a user interface screen, a mouse pointer, and the like, for inputting various information, are displayed on the display unit 8.

The control unit 10 further includes ROM 12 that stores data whose specifics are required to be held even when power is shut down; RAM 13 that stores data (a program) transferred from the auxiliary storage device 5 and data temporarily generated in the middle of processing; and a CPU 11 that executes a program stored in the ROM 12 and the RAM 13.

The auxiliary storage device 5 is a well-known hard disk drive (HDD) in which a large-capacity disk and a reader are combined into a single unit. The auxiliary storage device 5 includes at least a system folder into which various system files required for operation of an OS and an application program and a registry that stores information for causing the OS and the application program stored in the system folder to operate.

Further, a well-known operating system (herein after abbreviated as an "OS") having a multitask function for simultaneously performing a plurality of processing is installed in the information processing apparatus 20. Various types of software (i.e., programs) operate in an environment of the OS.

(Device Driver and Install Program)

An install package into which a device driver for controlling the image forming apparatus 30 and an install program for installing the device driver into the information processing apparatus 20 are unified will now be described.

Figure 2:
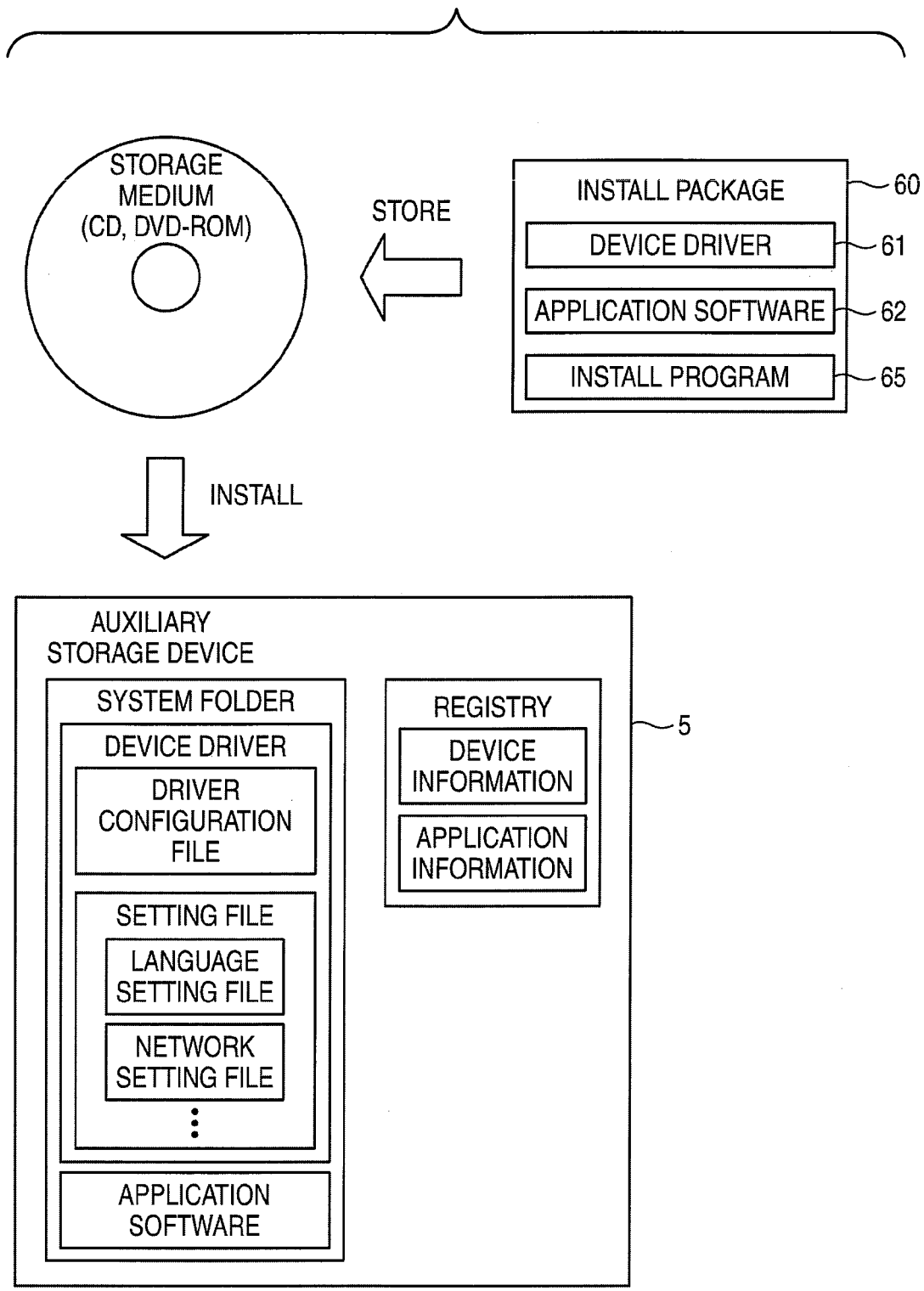
FIG. 2 is an explanatory drawing of an install package.

FIG. 2 is a descriptive view for describing an overview of the install package.

An install package 60 includes application software 62 for generating and processing various types of data; a device driver 61 for controlling the image forming apparatus 30 in addition to generating print data in synchronism with the application software 62; and an install program 65 for installing the device driver 61 into a personal computer including the information processing apparatus 20.

The install package 60 is distributed by a software provider while being stored in one portable storage medium (e.g., CD-ROM and DVD-ROM) (an example of a computer-readable medium) and configured so as to be read by a reader compatible with each of storage mediums, such as the data reader 6 of the information processing apparatus 20.

The word "application software 62" used herein includes software, or the like, for processing information acquired by peripheral equipment (a so-called device) in addition to including document data preparation software, spreadsheet software, presentation software, and general software, such as an image processing program.

Incidentally, the install program 65 is configured such that the information processing apparatus 20 performs a plurality of processing [the respective processing will also be referred to as "processing items" (corresponding to setting processing of the invention)], such as processing for receiving required information from the outside (herein after called input information setting processing) and processing for causing the user to ascertain information required for installation (herein after called "ascertainment processing").

In relation to the plurality of processing items, there have been prepared in advance, as input information setting processing, a model selection item that causes the user to select a model of the image forming apparatus 30 and that sets a result of selection; a language setting item for setting a display language in a user interface screen output to the display unit 8 at the time of performance of the device driver 61 and a language to be printed by the image forming apparatus 30; a function selection item for setting selection of a function of the install program 65; and the like.

Moreover, in relation to the plurality of processing items, there have been prepared in advance, as ascertainment processing, a permission ascertainment item for causing the user to ascertain the permission of use of a license, a connection ascertainment item for causing the user to ascertain a connection (whether or not a LAN cable or an USB cable is connected) between the image forming apparatus 30 and the information processing apparatus 20, a completion ascertainment item for causing the user to ascertain completion of all of the processing items, and the like. In addition, an install item for installing the device driver 61 into the information processing apparatus 20 is prepared as one of the processing items.

When the information processing apparatus 20 executes the install program 65, the processing items are assigned item numbers M (M is a natural number from one to the maximum value "m," and "m" is a natural number equal to or greater than two) such that processing pertaining to the respective processing items can be performed in accordance with a predetermined sequence. Specifically, in the exemplary embodiment, item number 2 (i.e., M=2) is assigned to the model selection item; item number 3 (i.e., M=3) is assigned to the language setting items; item number 4 (i.e., M=4) is assigned to the function selection item; and item number l ("l" is a natural number that is greater than four and smaller than "m") is assigned to the permission ascertainment item. Moreover, item number "o" ("o" is a natural number that is larger than "l" and smaller than "m") is assigned to the install item; item number "p" ("p" is a natural number that is larger than "o" and smaller than "m") is assigned to the connection ascertainment item; and item number "m" is assigned to the completion ascertainment item.

A user interface image [hereinafter also referred to as an "item-specific image" (corresponding to an image for setting purpose in the invention)] is provided for each processing item, wherein the user interface image has at least a button for shifting a predetermined sequence to the next processing item (hereinafter called a "shift command input button"), a button for shifting the predetermined sequence to an immediately-preceding processing item (hereinafter referred to as a "return button"), and a button for aborting processing complying with the install program 65 (hereinafter referred to as a "cancel button"). Therefore, inputting of information by the item-specific image is enabled by input information setting processing.

Installation of the device driver 61 described herein corresponds to well-known processing through which the followings are performed.

Specifically, a setting file to which the information processing apparatus 20 makes a reference when the image forming apparatus 30 is controlled is created in accordance with the information received through input information setting processing (i.e., at the time of operation of the device driver 61). The created setting file and a driver configuration file that is included in the device driver 61 for controlling the image forming apparatus 30 are stored in a specific location (e.g., a system folder) in the auxiliary storage device 5 managed by the OS. Device information formed from a correlation between the files and the image forming apparatus 30 (e.g., a location to which a file makes a reference), and the like, is registered in the registry.

The setting file includes at least a language setting file based on the information accepted in connection with the language setting item; a network setting including an output port based on an IP address of the image forming apparatus 30; and a control setting used at the time of use of the image forming apparatus 30.

When the device driver 61 compatible with the image forming apparatus 30 is installed in the exemplary embodiment, the driver configuration file forming the device driver 61 and the setting file are stored in the system folder, and the device information is registered in the registry, as shown in FIG. 2.

(Main Processing)

Main processing performed by the CPU 11 will now be described.

Figure 3:
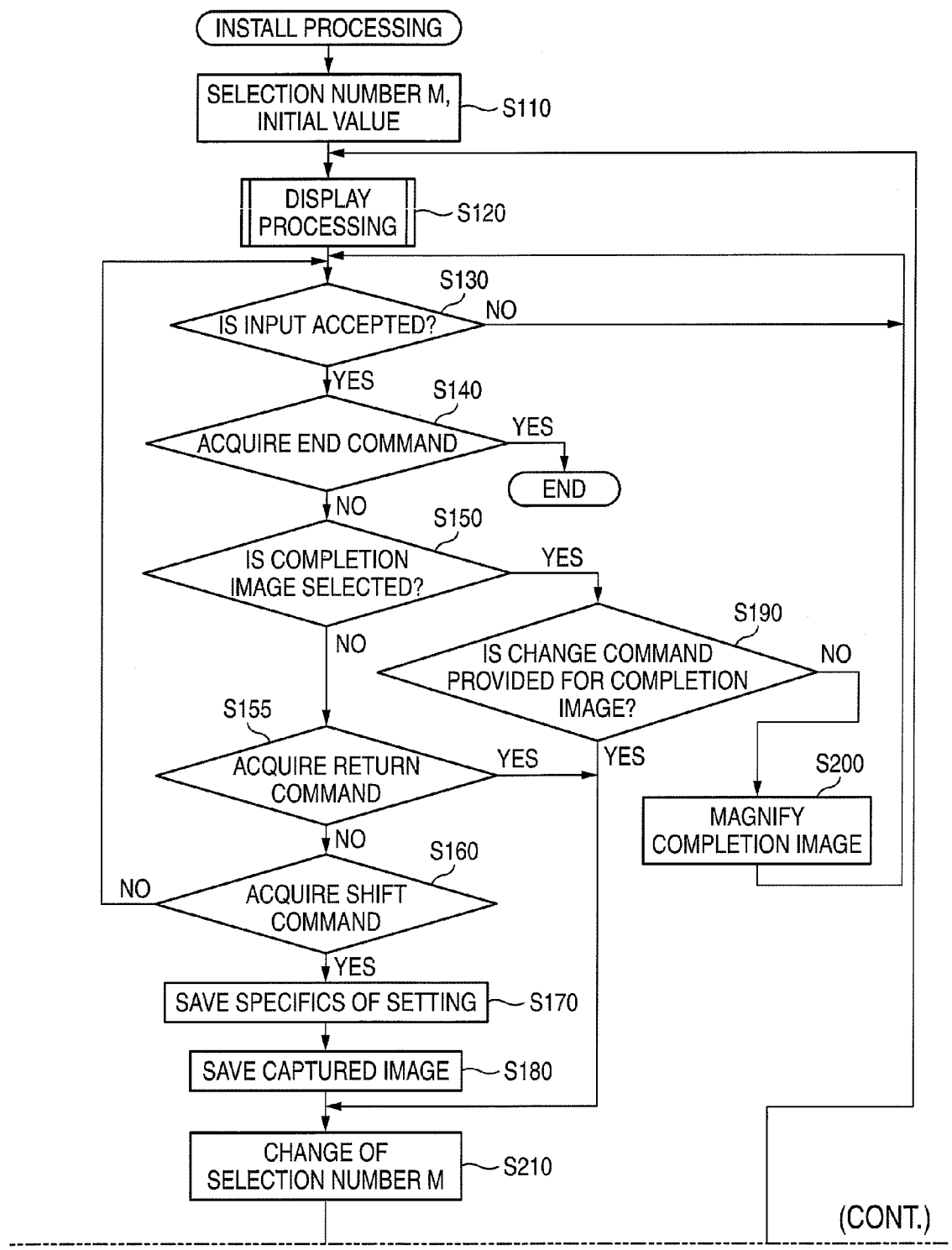
FIG. 3 is a flowchart showing processing procedures of main processing.

FIG. 3 is a flowchart showing processing procedures of main processing. Main processing is performed by the CPU 11 of the information processing apparatus 20 in accordance with the install program 65 when the install package 60 is read by the data reader 6.

When main processing is initiated, the item number M is first set as an initial value (i.e., M=1) in S110 as shown in FIG. 3, and processing proceeds to S120. In the following, a processing item in process of being executed by the CPU 11 is referred to as an active processing item; an item number M assigned to the active processing item is referred to as a current selection number M; and an item number assigned to a processing item to be performed next is referred to as the next selection number M. In S110, both the current selection number M and the next selection number M are set to M=1.

In S120, a reference is made to the current selection number M set in S110 (M=1 when display processing pertaining to S120 is performed first), and a user interface image (hereinafter called a "current display image") is displayed in a display area previously defined on the display unit 8, and display processing for making a shift of processing item is performed. Display processing pertaining to S120 will be described in detail later.

Figure 5:
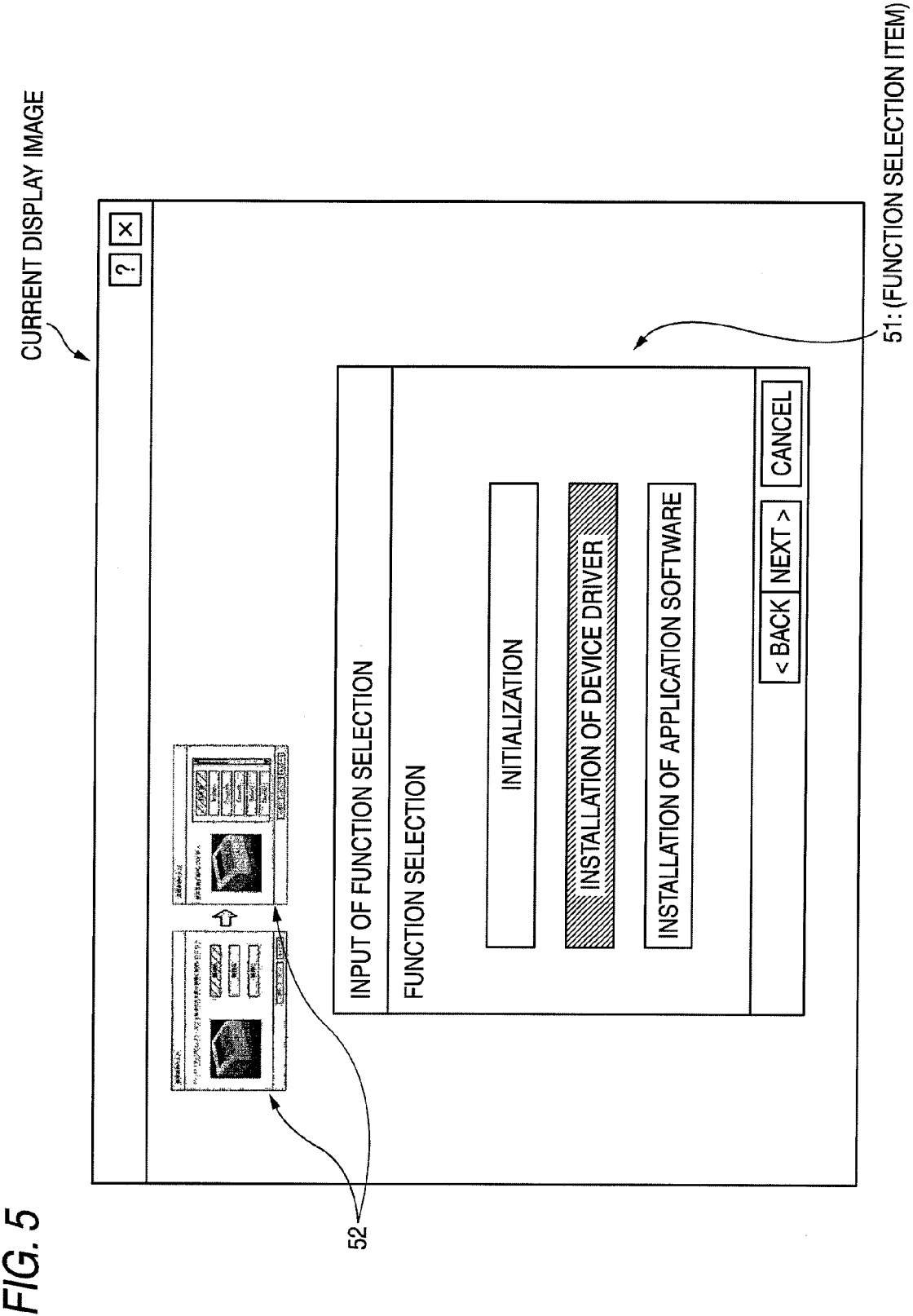
FIG. 5 is a descriptive view for describing a current display image.

As shown in FIG. 5, the current display image includes a specific area 51 where an item-specific image corresponding to the processing item of the current selection number M is displayed and at least one defined area 52 where an item-specific image corresponding to the processing item which has already been displayed and that is previously defined as an area separate from the specific area 51.

An item-specific image displayed in the specific area 51 is hereunder referred to as an active image, and an item-specific image displayed in the defined area 52 is referred to as a completion image. In relation to the current display image shown in FIG. 5, an item-specific image corresponding to the function selection item is displayed as an active image, and an item-specific image corresponding to a model selection item and an item-specific image corresponding to a language selection item are displayed as completion images.

Consequently, every time display processing is performed in S120, the active processing item is changed, and the active image is switched to an item-specific image corresponding to another processing item.

In S130, a determination is made, on the current display image, as to whether or not an input provided by the operation unit 7 is accepted. If a result of determination shows that the input is not accepted, processing waits until the input is accepted. When the input is accepted, processing proceeds to S140 (an example of an information acceptance process, an example of a shift command acceptance process, an example of a first selection acceptance process, and an example of a second selection acceptance process).

A determination is made in step S140 as to whether or not the input accepted in S130 is an end command that shows completion of main processing. When a result of determination shows an end command, main processing is completed. In contrast, when the result of determination is not an end command, processing proceeds to S150.

Specifically, in the exemplary embodiment, the end command is assumed to be inputted in a case where pressing of a cancel button performed in the active image is detected; where pressing of the shift command input button is detected when the active processing item is an end ascertainment item; and where pressing of a close box for closing a window of the current display image is detected. The expression "pressing of a button" provided herein includes operations for putting a cursor displayed on the display unit 8 on each of various buttons by means of a mouse included in the operation unit 7 and clicking the mouse and operations for putting the cursor displayed on the display unit 8 on each of the various buttons by means of a keyboard included in the operation unit 7 and pressing a previously-specified key of the keyboard.

Moreover, a determination is made in S150 as to whether or not the input accepted in S130 is selection of a completion image. When a result of determination shows that the input is not selection of a completion image, an input is assumed to be accepted in S130 in connection with the active image, and processing proceeds to S155. Specifically, in the exemplary embodiment, when operation of the operation unit 7 performed while the cursor displayed on the display unit 8 is put on the completion image (e.g., clicking action of the mouse) is detected, a change command is assumed to be inputted in connection with the completion image.

In S155, a determination is made as to whether or not the input accepted in S130 is a return command for returning a processing item to an immediately-preceding processing item. When a result of determination shows that the input is a return command, processing proceeds to S210. In contrast, when the result of determination shows that the return command is not input, processing proceeds to S160. Specifically, in the exemplary embodiment, when pressing of a return button (a "return" button in FIG. 5) performed in the active image is detected, a shift command is assumed to be inputted.

In S160, a determination is made as to whether or not the input accepted in S130 is a shift command for causing the processing to process one item. When a result of determination shows that the input is not the shift command, processing returns to S130. In contrast, when the result of determination shows that the shift command is inputted, processing proceeds to S170.

Specifically, in the exemplary embodiment, when pressing of the shift command input button (a "next" button in FIG. 5) performed in the active image is detected, the shift command is assumed to be inputted.

In S170, settings about an active processing item are stored in the RAM 13 in accordance with the input accepted in S130 by the active image. Namely, when a processing item corresponding to the active image is inputted information setting processing, specifics input by the active image are saved. When the processing item corresponding to the active image is ascertainment processing, completion of ascertainment of specifics to be ascertained through ascertainment processing is saved. The settings stored in the RAM 13 are used for creating a setting file when processing pertaining to an install item is performed.

In S180, an active image acquired at a point in time when the shift command is inputted, namely, an image showing information accepted in connection with the active processing item, is captured by use of a capture function for saving an image displayed on the display unit 8 in its present form. The captured image is stored as a captured image in the RAM 13. Processing proceeds to S210.

Incidentally, when a result of determination made in S150 shows that the input accepted in S130 is selection of a completion image, processing proceeds to S190.

In S190, a determination is made as to whether or not the input made in connection with the completion image is a change command for changing specifics of the processing item corresponding to the selected completion image. When a result of determination shows that the input made in connection with the completion image is not the change command, processing proceeds to S200.

In S200, the completion image selected in S130 is displayed so as to become larger than another completion image for a previously-defined specific period of time, and processing returns to S130 (an example of an ascertainment mode display process).

Specifically, in the exemplary embodiment, when clicking the operation unit 7 (herein assumed to be a mouse) with the cursor on the display unit 8 being put on a completion image is detected, a selection command is assumed to be inputted in connection with the completion image.

In the meantime, when the result of determination made in S190 shows that an input made in connection with the completion image is a change command, processing proceeds to S210. Specifically, in the exemplary embodiment, when double-clicking the operation unit 7 (herein assumed to be a mouse) with the cursor on the display unit 8 being put on the completion image is detected, a change command is assumed to be inputted in connection with the completion image.

In S210, the item number M assigned to a location where proceeding is to be made (a destination) is set as the next selection number M. In short, when processing proceeds to S210 by S160, a shift is assumed to be made in accordance with the predetermined sequence. A number that is the sum of the current selection number M and one is assumed to be the next selection number M. When processing proceeds from S155 to S210, a result determined by subtracting one from the current selection number M is taken as the next selection number M. When processing proceeds to S210 by S190, the item number M assigned to a processing item corresponding to the selected completion image is taken as the next selection number M.

In S220, a determination is made as to whether or not the destination complies with the defined sequence. When a result of determination shows that the destination complies with the defined sequence, processing returns to S120. In S120, display processing is performed by making a reference to the next selection number M set in S210. When the destination does not comply with the defined sequence, processing proceeds to S230.

In S230, a determination is made as to whether or not the defined sequence of the active processing item corresponds to an install item or a subsequent item, namely, whether or not the current selection number M is greater than an item number "o" of the install item. When a result of determination shows that the current selection number M is smaller than the item number "o" of the install item, processing returns to S120. In the meantime, when the result of determination shows that the current selection number M is greater than the item number "o" of the install item, processing proceeds to S240.

In S240, a determination is made as to whether or not the defined sequence of a processing item at the destination corresponds to an install item or a subsequent item, namely, whether or not the next selection number M set in S210 is equal to or greater than an item number "o" of the install item. When a result of determination shows that the next selection number M set in S210 is greater than the item number "o" of the install item, processing returns to S120. In the meantime, when the result of determination shows that the next selection number M set in S210 is smaller than the item number "o" of the install item, processing proceeds to S250.

Subsequently, in S250, there is displayed an ascertainment image for causing the user, and the like, to ascertain whether or not the device driver 61 installed in relation to the install item is again installed (an example of an execution selection acceptance process). The reason for this is that, when the device driver 61 is again installed, the setting file and the driver configuration file stored in the auxiliary storage device are uninstalled in connection with the install item. Efforts may be reduced, depending on a processing item whose change is desired by the user, by changing only a processing item to be changed after completion of processing pertaining to all processing items.

The ascertainment image is a user interface image having a re-install button for inputting a command for re-installation and a reject button for inputting a command for not performing re-installation.

In S260, a determination is made as to whether or not the command input by the ascertainment image displayed on the display unit 8 in S250 means re-installation. When a result of determination shows that the command does not mean re-installation, namely, when pressing of the rejection button is detected, the next selection number M is changed to the sum of the current selection number M and one, and processing returns to S120.

In the meantime, when the result of determination made in S260 shows that the command input by the ascertainment image means re-installation, the change of the next selection number M is prohibited (an example of a shift prohibition process), and processing proceeds to S270. In S270, settings made in connection with the item number M that precedes the next selection number M in terms of the defined sequence, namely, a processing item corresponding to an item number M whose value is smaller than the next selection number M, are maintained. Further, settings made in connection with the processing item corresponding to the item number M whose value is equal to or greater than the next selection number M are deleted (an example of an information cancellation process).

Subsequently, in S280, the device driver 61 installed in connection with the install item that has already been performed is uninstalled, and processing returns to S120.

A series of processing operations, which are the sum of processing pertaining to S230 to S280 and an install item to be again performed, correspond to an example of a re-install process.

(Display Processing)

Display processing performed in S120 of main processing will now be described.

Figure 4:
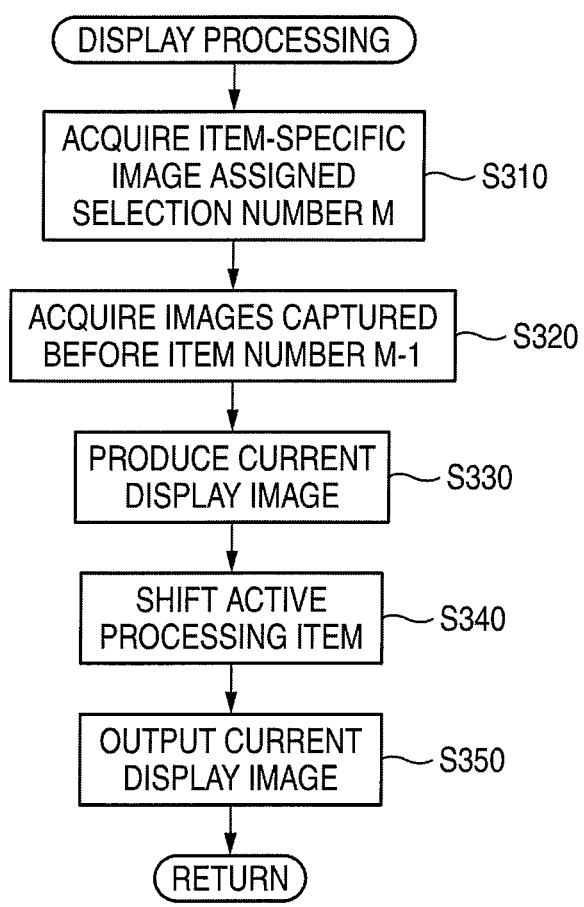
FIG. 4 is a flowchart showing processing procedures of display processing.

FIG. 4 is a flowchart showing processing procedures of display processing.

Display processing is performed in S120 of main processing. When display processing is initiated, an item-specific image of a processing item corresponding to the next selection number M is first acquired as an active image in S310.

Subsequently, in S320, all captured images corresponding to processing items achieved before an item number M−1 immediately preceding the next selection number M (i.e., the item number M that has been the current selection number M until processing proceeds to display processing) are acquired as completion images.

In S330, all of the captured images acquired in S320 before the item number M−1 are taken as completed images, and the completed images are arranged in the defined area 52 in accordance with the predetermined sequence of corresponding processing items (an example of a third display control process). An item-specific image of the next selection number M acquired in S310 is taken as an active image, whereby a current display image located in the specified area 51 is produced.

Subsequently, in S340, processing proceeds to a processing item of the next selection number M (an example of a processing shift process). Namely, an active processing item becomes a processing item corresponding to the next selection number M.

In S350, a video signal is output in such a way that a current display image produced in S330 is displayed on the display unit 8 (an example of a first display control process and an example of a second display control process). All of the completion images achieved before the item number M−1 arranged along the defined sequence and a current display image for which an item-specific image of the current selection number M taken as an active image are displayed on the display unit 8.

Processing then returns to S130 of main processing.

Specifically, the active processing item is shifted to a processing item corresponding to the next selection number M during display processing pertaining to S120. The display unit 8 displays a current display image, in which an item-specific image corresponding to a processing item of the next selection number M is taken as an active image and all images captured up to an item number M−1 that is smaller than the next selection number M by one in terms of the defined sequence are taken as completion images.

(Operation)

Example operation performed when the information processing apparatus 20 performs main processing will now be described.

Figure 6:
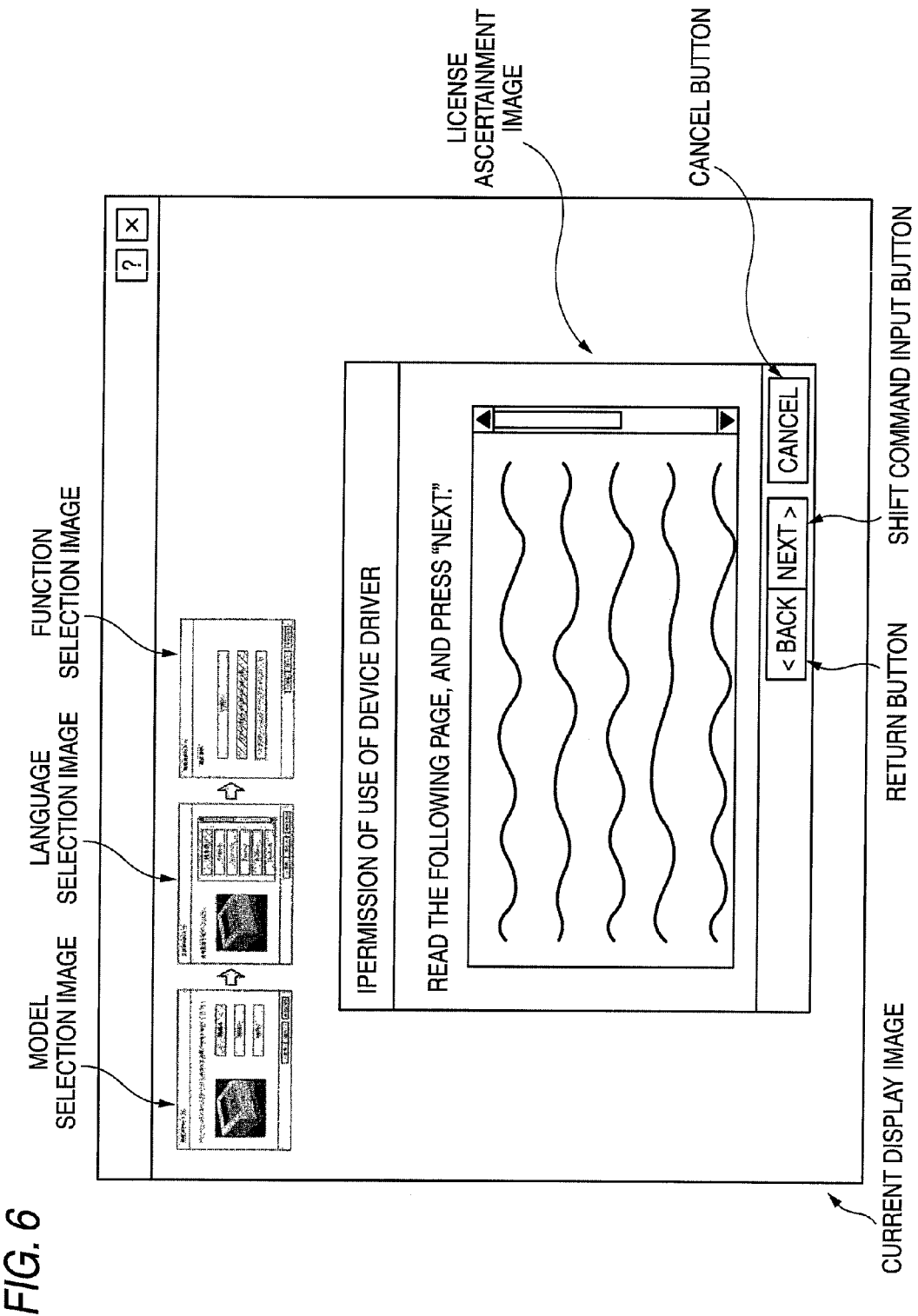
FIG. 6 is a descriptive view showing an example of the current display image provided by the display processing.
Figure 7:
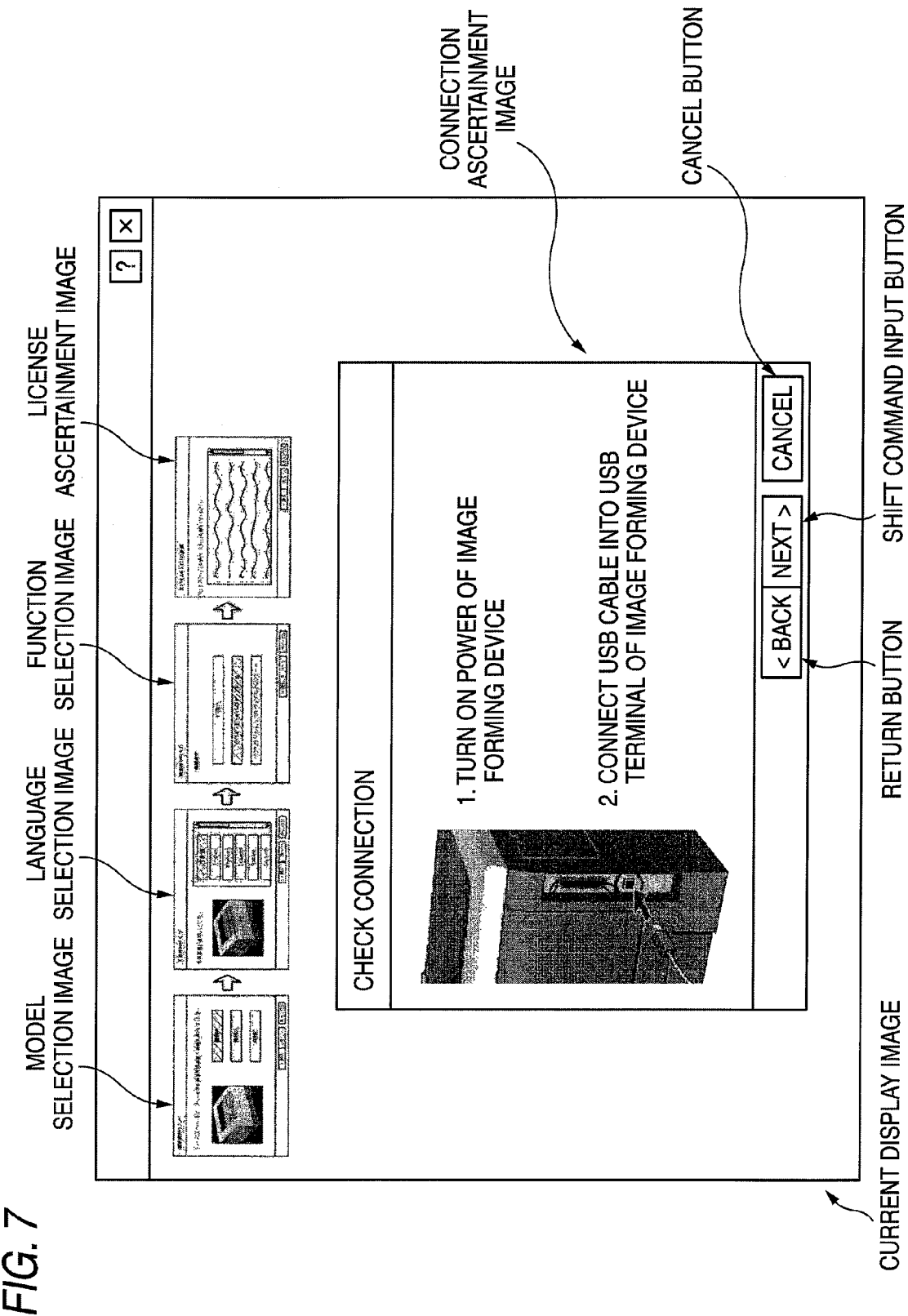
FIG. 7 is a descriptive view showing another example of the current display image provided by the display processing.
Figure 8:
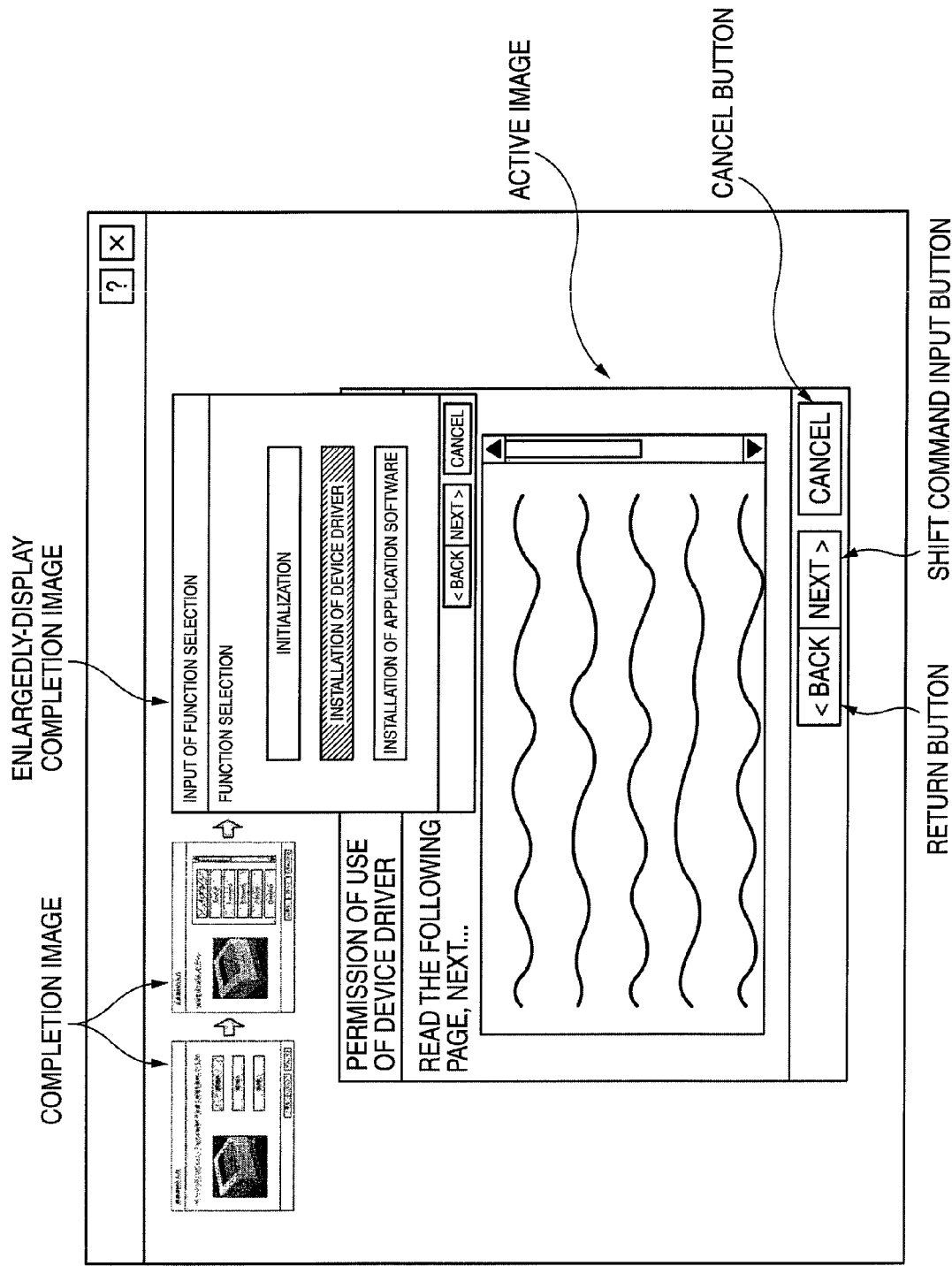
FIG. 8 is a descriptive view showing an example of a display image provided by the display processing.

FIGS. 6, 7, and 8 are descriptive views showing example screens displayed on the display unit at the time of performance of main processing.

FIG. 6 shows a current display image that provides an item-specific image (herein after called a "permission ascertainment screen") corresponding to the permission ascertainment item (i.e., item number 1) as an active image and that provides an item-specific image (herein after called a "model selection image") corresponding to the model selection item (i.e., item number 2), an item-specific image (herein after called a "language selection screen") corresponding to the language selection items (i.e., item number 3), and an item-specific image (herein after called a "function selection screen") corresponding to the function selection item (i.e., item number 4) as completion images. FIG. 7 shows a current display image that provides an item-specific image (herein after called a "connection ascertainment image") corresponding to the connection ascertainment item (i.e., item number p) as an active image and that provides the permission ascertainment image, the function selection image, the model selection image, and the language selection image as completion images.

It is assumed that the current display image, such as that shown in FIG. 6, is displayed on the display unit 8.

In this case, a user's input is accepted by the current display image in S120 of main processing. At this time, the permission ascertainment item is the ascertainment processing item. Thus, acceptable information is limited to any information (herein after called "completion image selection information") indicating selection of an end command, a shift command, a return command, and a completion image. The completion image selection information is classified into a change command and ascertainment selection that is selection of a command other than the change command.

Specifically, when the current display image, such as that shown in FIG. 6, is displayed on the display unit 8, conceivable operation that may be performed by the user includes pressing of a cancel button in an active image for inputting an end command, pressing of a shift command input button in the active image for inputting a shift command, pressing of a return button for inputting a return command, and the like. Other conceivable operation includes double-clicking of a completion image for inputting a change command and clicking of a completion image for inputting ascertainment selection (i.e., displaying a completion image in an enlarged manner).

Consequently, when the function selection image in the completion image is clicked (S150: YES and S190: NO), a selected completion image is displayed in an enlarged manner than are the other completion images in S200 of main processing as shown in FIG. 8. When the cancel button is pressed (S140: YES), a negative determination is made in S140 of main processing, whereupon main processing is terminated.

In the meantime, the item number "l" of the permission ascertainment item is smaller than the item number "o" of the install item (i.e., the permission ascertainment item precedes the install item in terms of the defined sequence) (S230: NO). For this reason, when the shift command input button is pressed, an affirmative determination is made in S160 of main processing. There is displayed a current display image that takes, as an active image, an item-specific image corresponding to a processing item to which a shift has been made in accordance with the defined sequence. When a completion image is double-clicked (S150: YES and S190: YES), an affirmative determination is made in S190 of main processing. There is displayed a current display image for which an item-specific image of a processing item corresponding to the selected completion image is taken as an active image.

Even when the current display image, such as that shown in FIG. 7, is displayed on the display unit 8 as a result of main processing being iterated several cycles, acceptable information is limited to any of the end command, the shift command, the return command, the change command, and the ascertainment selection, because the connection ascertainment item is an ascertainment processing item. In a word, conceivable operation that may be performed by the user includes pressing of the cancel button, pressing of the return button, pressing of the shift command input button, double-clicking of the completion image, and clicking of the completion image.

Therefore, when a completion image is clicked, the selected completion image is displayed in an enlarged manner than are the other completion images in S200 of main processing. When the cancel button is pressed, a negative determination is made in S160 of main processing. Further, when the shift command button is pressed, an affirmative determination is made in S140 of main processing, and main processing is completed. There is displayed a current display image that takes, as an active image, an item-specific image of a processing item corresponding to the selected completion image.

In the meantime, when the completion image is double-clicked, an affirmative determination is made in S190 of main processing. However, an item number "p" of the connection ascertainment item is larger than the item number "o" of the install item (i.e., the connection ascertainment item follows the install item in terms of the defined sequence) (S230: YES). Therefore, a determination is made in S240 of main processing as to whether or not an item number of the processing item corresponding to the selected completion image (herein after called a "corresponding processing item") is smaller than the item number "o" of the install item (i.e., whether or not the corresponding processing item precedes the install item in terms of the defined sequence).

At this time, when the item number of the corresponding processing item is larger than the item number "o" of the install item (S240: NO), the current display image for which an item-specific image of the corresponding processing item is taken as an active image is displayed. However, when the item number of the corresponding processing item is smaller than the item number "o" of the install item (S240: YES), the ascertainment image is displayed on the display unit 8 (S250) and the user selects whether to perform re-install operation. When performance of re-install operation is selected (S260: YES), the software installed in connection with a preceding install item is uninstalled. Processing is again performed from processing pertaining to a corresponding processing item, and re-install operation is performed at the install item.

Namely, in main processing of the exemplary embodiment, there is displayed a current display image that takes an item-specific image of the current selection number M as an active image and that takes all images captured before an item number M−1 as completion images, and an input performed by the operation unit 7 is accepted. When the accepted input is clicking of a completion image, a selected completion image is displayed in an enlarged manner. When the accepted input is pressing of the cancel button, main processing is completed. Further, when the accepted input is pressing of the shift command input button, the next selection number M is changed. Subsequently, there is displayed a current display image for which an item-specific image of the next selection number M is taken as an active image.

When the accepted input is a change command, a determination is made, in main processing, as to whether or not the current selection number M is larger than the item number "o" of the install item and whether or not the next selection number M is smaller than the item number "o" of the install item. When results of determination are affirmative determinations, the user is caused to select whether to perform re-install operation.

As described above, according to main processing of the exemplary embodiment, a current display image including an active image and a completion image arranged within a single image is provided. Therefore, the user can be caused to ascertain specifics of information inputted in connection with a processing item that has already been performed (herein after "inputted information") without returning a processing item in the course of performance of a program. According to main processing of the exemplary embodiment, a completion image and an active image are displayed in separate areas, and the completion images are displayed while being arranged in accordance with the defined sequence. Therefore, the user can readily find inputted information that the user desires to know.

In particular, according to main processing of the exemplary embodiment, when selection of a completion image is accepted by the current display image, the selected completion image is displayed in an enlarged manner. Therefore, the user can be caused to ascertain specifics of inputted information more reliably.

Moreover, according to main processing of the exemplary embodiment, when a change command for the completion image is accepted by the current display image, there is made a shift toward a processing item corresponding to the selected completion image. Therefore, the user can input a change to the inputted information by means of selecting the completion image.

Incidentally, according to main processing of the exemplary embodiment, when the item number of the active processing item is larger than the item number "o" of the install item and when the current selection number M is smaller than the item number "o" of the install item, the user can select whether to perform re-install operation according to efforts. Therefore, usability can be improved.

According to main processing of the exemplary embodiment, a completion image is produced by capture of an active image. Therefore, a completion image can be readily produced. According to main processing of the exemplary embodiment, the item-specific image for which the user inputted information is displayed as a completion image in each of the processing items. Therefore, the user can more-reliably find inputted information that the user desires to know.

While the present invention has been shown and described with reference to certain exemplary embodiments thereof, it will be understood by those skilled in the art that various changes in form and details may be made therein without departing from the spirit and scope of the invention as defined by the appended claims.

For example, in display processing of the above-described exemplary embodiments, a captured image in which an active image is captured is taken as a completion image. However, the completion image is not limited to the captured image. Images newly generated by means of main processing and display processing may also be taken as completion images. In short, information accepted when a corresponding processing item is an active processing item is displayed. Any image may be acceptable, so long as the image enables the user to ascertain the information.

Moreover, in the display processing of the above-described exemplary embodiments, the completion images are displayed while being arranged in the defined sequence. Alternatively, displaying a completion image while an area in the image where information is displayed is made different in color from the other area, displaying in boldface type only an area in a completion image where information is provided, and the like, may also be performed. That is, in display processing, an area in the completion image where information is provided may also be displayed in a more highlighted manner than the other area of the completion image.

Displaying the area in the completion image where information is provided in a highlighted fashion as mentioned above enables the user to more-reliably ascertain specifics of the information inputted in connection with the corresponding processing item.

In display processing of the above-described exemplary embodiments, only a completion image corresponding to a processing item that has already been performed (i.e., processing items to a processing item of an item number M−1 that immediately precedes the current selection number M) is displayed in the defined area 52. However, the image displayed in the defined area 52 is not limited to an image corresponding to the processing item that has already been performed. For example, an item-specific image corresponding to a processing item that has not yet been performed but is scheduled to be performed by the information processing apparatus 20 (i.e., a processing item of the current selection number M or a subsequent selection number) can also be displayed.

As mentioned above, when an image of the current selection number M or a subsequent selection number is displayed in the defined area 52, the user can be caused to previously ascertain all processing items, which are scheduled to be performed, before each of processing items is performed. As a consequence, the user can readily ascertain the state of progress achieved at the present point in time.

In S170 of main processing of the above-described exemplary embodiments, after a shift command has been accepted, settings (information) accepted in connection with the active processing items are collectively saved. Alternatively, saving of settings (information) can also be performed every time information is inputted in connection with each of the setting processing items, so long as the active processing item is a setting processing item.

Moreover, in S200 of main processing of the above-described exemplary embodiments, when the operation unit 7 is operated for a completion image, the selected completion image is displayed in an enlarged manner. However, specifics performed in S200 are not limited to an enlarged display. For example, in a selected completion image, an area where settings (information) are provided may also be displayed while being made different in color from the other area.

In main processing of the above-described exemplary embodiments, when the current selection number M is larger than the item number "o" of the install item and when the next selection number M is smaller than the item number "o" of the install item, an ascertainment display is displayed in S250.

However, in such a case, in order to make a shift toward a processing item corresponding to the next selection number M (herein after called a "processing item to be changed"), software installed in connection with the install item must be uninstalled. Therefore, so long as the processing item to be changed can be changed after performance of processing pertaining to all processing items, efforts can be lessened by performing processing pertaining to the remaining processing items rather than returning processing to the processing item to be changed.

Therefore, when an affirmative determination is made in S230 and S240, main processing of the above-described exemplary embodiments may also be performed so as to return to S120 by taking the sum of the current selection number M and one as the next selection number M and without re-installing software.

Incidentally, when the processing item that is shifted in accordance with a shift command is an ascertainment processing item, no change is made to the information (settings) input by the user. Therefore, a previously-prepared item-specific image is univocally derived as a completion image corresponding to the ascertainment processing item.

Therefore, in the main processing of the above-described exemplary embodiments, when a shift command is accepted, a determination is made as to whether or not the processing item corresponding to the current selection number M is an ascertainment processing item. When a result of determination shows that the corresponding processing items is the ascertainment processing item, an item-specific image corresponding to the ascertainment processing item can also be displayed without modifications as a completion image.

In the above-described exemplary embodiments, a command accepted by the CPU when the shift command input button is pressed is called a shift command. However, the shift command is not limited to such a command. A return command or a change command may also be taken as one of shift commands. In short, a shift command of the invention may include a return command or a change command.

In the above-described exemplary embodiments, descriptions have been provided on the assumption that the device driver 61 is installed in accordance with the install program 65. However, the software installed in accordance with the install program 65 is not limited to the device driver 61. For example, the application software 62, and the like, may also be acceptable. Further, the install package 60 can also be acquired by means of being downloaded from a server in a network, or the like.

Moreover, the invention is not limited to the application to the install program 65. For example, the invention may also be applied to a program that browses home pages (HP) on the WEB.

What is claimed is:

1. A non-transitory computer-readable storage device having a computer program stored thereon and readable by a computer, the computer program, when executed by an information processing apparatus, causes the information processing apparatus to perform steps comprising:
   a first display control process comprising displaying a first setting image having a plurality of setting options for performing a setting acceptance process, and an input completion image for the setting acceptance process which has been performed;
   a first setting acceptance process comprising accepting a setting from among the plurality of setting options through the first setting image displayed in the first display control process;
   a shift command acceptance process comprising accepting a shift command for making a shift to a second setting acceptance process different from the first setting acceptance process;
   a second display control process comprising concurrently displaying, responsive to the shift command being accepted in the shift command acceptance process, the input completion image after performing the first setting acceptance process, a second setting image for performing the second setting acceptance process, and the input completion image for which the second setting acceptance process that is not the first setting acceptance process has been performed;
   a selection acceptance process comprising accepting a selection command for selecting one of the input completion images displayed in the second display control process; and
   a shift process comprising making a shift to the first display control process so as to display the setting image corresponding to the selected input completion image when the selection command is accepted in the selection acceptance process, the shift process further comprising an information invalidation process comprising invalidating information accepted in an information acceptance process in a setting acceptance process that follows, in a predetermined sequence, the setting acceptance process corresponding to the input completion image selected in the selection acceptance process,
   wherein each input completion image shows the plurality of setting options displayed in a corresponding setting image and identifiably shows the setting accepted in a corresponding setting acceptance process.

2. The non-transitory computer-readable storage device according to claim 1, wherein the second display control process comprises displaying the input completion image in a mode distinguishable from the setting image.

3. The non-transitory computer-readable storage device according to claim 1, wherein the second display control process comprises displaying the input completion images while the input completion images are arranged in a predetermined sequence.

4. The non-transitory computer-readable storage device according to claim 1, wherein the first setting acceptance processing comprises install processing, the install processing comprising installing software in the information processing apparatus.

5. The non-transitory computer-readable storage device according to claim 4, wherein the computer program, when executed by the information processing apparatus, causes the information processing apparatus to perform steps comprising:
 a selection acceptance process comprising accepting a selection command for selecting one of the input completion images displayed in the second display control process; and
 an ascertainment mode display process comprising displaying a selected input completion image in a mode, in which information accepted in an information acceptance process is recognizable, when the selection command is accepted in the selection acceptance process.

6. The non-transitory computer-readable storage device according to claim 4,
 wherein a setting acceptance process corresponding to a setting image displayed in the first display control process is a current setting acceptance process,
 wherein a setting acceptance process corresponding to the input completion image selected in the selection acceptance process is a setting acceptance process to be changed,
 wherein the computer program, when executed by the information processing apparatus, causes the information processing apparatus to perform steps comprising:
 a determination as to whether the current setting acceptance process follows the install processing in a predetermined sequence, and another determination as to whether the setting acceptance process to be changed precedes the install processing in the predetermined sequence, and
 a shift prohibition process comprising prohibiting the shift process when results of determination show that the current setting acceptance process follows the install processing in the predetermined sequence and when the setting acceptance process to be changed precedes the install processing in the predetermined sequence.

7. The non-transitory computer-readable storage device according to claim 4,
 wherein a setting acceptance process corresponding to a setting image displayed in the first display control process is a current setting acceptance process,
 wherein a setting acceptance process corresponding to the input completion image selected in the selection acceptance process is a setting acceptance process to be changed,
 wherein the computer program, when executed by the information processing apparatus, causes the information processing apparatus to perform steps comprising:
 a determination as to whether the current setting acceptance process follows the install processing in a predetermined sequence, and another determination as to whether or not the setting acceptance process to be changed precedes the install processing in the predetermined sequence, and a re-install process comprising re-installing the software in accordance with information accepted in an information acceptance process when results of the determination show that the current setting acceptance process follows the install processing in the predetermined sequence and when the setting acceptance process to be changed precedes the install processing in the predetermined sequence, a shift is made toward the shift process.

8. The non-transitory computer-readable storage device according to claim 7, wherein the re-install process further comprises an execution selection acceptance process comprising causing a user to select whether to perform a re-install operation.

9. The non-transitory computer-readable storage device according to claim 1, wherein the second display control process further comprises displaying the input completion image in which information accepted in an information acceptance process for the first setting acceptance process is highlighted.

10. The non-transitory computer-readable storage device according to claim 1, wherein the computer program, when executed by the information processing apparatus, causes the information processing apparatus to further perform steps comprising:
 a third display control process comprising displaying all setting acceptance processes scheduled to be performed by the information processing apparatus.

11. The non-transitory computer-readable storage device according to claim 1, wherein each completion image further shows a setting from among the plurality of setting options that was not the setting accepted in the corresponding setting acceptance process.

12. An information processing apparatus comprising:
 a processing unit; and
 a memory having computer readable instructions stored thereon that, when executed by the processing unit perform operations comprising:
 a first display control process comprising displaying a first setting image having a plurality of setting options for performing a setting acceptance process, and an input completion image for the setting acceptance process which has been performed;
 a first setting acceptance process comprising accepting a setting from among the plurality of setting options through the first setting image displayed in the first display control process;
 a shift command acceptance process comprising accepting a shift command for making a shift to a second setting acceptance process from the first setting acceptance process;
 a second display control process comprising concurrently displaying, responsive to the shift command being accepted in the shift command acceptance process, the input completion image after performing the first setting acceptance process, a second setting image for performing the second setting acceptance process, and the input completion image for which the setting acceptance process that is not the first setting acceptance process has been performed;
 a selection acceptance process comprising accepting a selection command for selecting one of the input completion images displayed in the second display control process; and
 a shift process comprising making a shift to the first display control process so as to display the setting image corresponding to the selected input completion image when the selection command is accepted in the selection acceptance process, the shift process further comprising an information invalidation process comprising invalidating information accepted in an information acceptance process in a setting acceptance process that follows, in a predetermined sequence, the setting acceptance process corresponding to the input completion image selected in the selection acceptance process, wherein each input completion image shows the plurality of setting options displayed in a corresponding setting image and identifiably shows its setting accepted in a corresponding setting acceptance process.

13. The information processing apparatus according to claim 12, wherein each completion image further shows a setting from among the plurality of setting options that was not the setting accepted in the corresponding setting acceptance process.

14. A display control method comprising:
- first displaying a first setting image having a plurality of setting options for performing a setting acceptance process, and an input completion image for the setting acceptance process which has been performed;
- accepting a setting from among the plurality of setting options through the first setting image displayed in the first displaying;
- accepting a shift command for making a shift to a second setting acceptance process different from the first setting acceptance process;
- second displaying concurrently, responsive to the shift command being accepted, the input completion image after performing the first setting acceptance process, a second setting image for performing the second setting acceptance, and the input completion image for which the setting acceptance process that is not the first setting acceptance process has been performed;
- accepting a selection command for selecting one of the input completion images displayed in the second displaying; and
- making a shift to the first displaying so as to display the setting image corresponding to the selected input completion image when the selection command is accepted, and invalidating information accepted in an information acceptance process in a setting acceptance process of accepting a setting that follows, in a predetermined sequence, the setting acceptance process corresponding to the input completion image selected in accepting the selection command, wherein each input completion image shows the plurality of setting options displayed in a corresponding setting image and identifiably shows its setting accepted in a corresponding setting acceptance process.

15. The display control method according to claim 14, wherein each completion image further shows a setting from among the plurality of setting options that was not the setting accepted in the corresponding setting acceptance process.

* * * * *